US010665125B2

(12) United States Patent
Davis

(10) Patent No.: US 10,665,125 B2
(45) Date of Patent: May 26, 2020

(54) TRAINING KIT FOR INVESTIGATING POLICE SCENES

(71) Applicant: Wayne L. Davis, Orland, IN (US)

(72) Inventor: Wayne L. Davis, Orland, IN (US)

( * ) Notice: Subject to any disclaimer, the term of this patent is extended or adjusted under 35 U.S.C. 154(b) by 459 days.

(21) Appl. No.: 14/968,167

(22) Filed: Dec. 14, 2015

(65) Prior Publication Data
US 2017/0169722 A1 Jun. 15, 2017

(51) Int. Cl.
G09B 19/00 (2006.01)
G09B 1/08 (2006.01)

(52) U.S. Cl.
CPC ............... G09B 19/00 (2013.01); G09B 1/08 (2013.01)

(58) Field of Classification Search
None
See application file for complete search history.

(56) References Cited

U.S. PATENT DOCUMENTS

| 3,646,690 | A | * | 3/1972 | Feagan | ............ | G09B 25/04 434/73 |
| 4,017,986 | A | * | 4/1977 | Miller | ............ | G09B 25/08 434/73 |
| 2004/0020813 | A1 | * | 2/2004 | Moeller | ............ | A45C 11/00 206/425 |
| 2005/0241590 | A1 | * | 11/2005 | Koznarek | ............ | A01K 63/003 119/270 |

OTHER PUBLICATIONS

"This murder hasn't happened yet", accessed at: http://geekromance.wikifoundry.com/page/Case+%234+-+Officer+Kamen (May 17, 2009).*
Magnetic Rescue 911. (n.d.). Retrieved Dec. 10, 2015, from http://www.tagalongtoys.ca/magnetic-rescue-911.html.
Magnetic Create-A-Scene™.(n.d.). Retrieved Dec. 10, 2015, from http://www.patchproducts.com/c/shop-by-category_activities_magnetic-create-a-scene.
Travel Chess Sets. (n.d.). Retrieved Dec. 10, 2015, from http://www.houseofstaunton.com/chess-sets/travel-chess-sets.html.
Sally Lee by the Sea. (Nov. 3, 2012). Retrieved Dec. 14, 2015, from http://nauticalcottageblog.com/2012/11/favorite-find-coastal-christmas-globe/beach-decor-beach-christmas-sand-snow-globe-b/.
Find It® Games—The Ultimate Contained Adventure. (n.d.). Retrieved Dec. 10, 2015, from http://www.finditgames.com/.

* cited by examiner

Primary Examiner — James B Hull
(74) Attorney, Agent, or Firm — Dunlap Bennett & Ludwig PLLC

(57) ABSTRACT

A police scene simulation kit is provided. The kit includes a container. The container includes a planar inner surface and a plurality of sidewalls extending from the planar inner surface. The planar inner surface includes a printed design. The printed design resembles a police scene. The kit further includes a plurality of pieces. The plurality of pieces releasably attach to the planar inner surface. The plurality of pieces each resemble an object at a police scene.

8 Claims, 4 Drawing Sheets

POLICE SCENE KIT

MAGNETIC POSTER BOARDS WITH PRINTED SETTINGS AND CONTAINER WITH FILLER

POSTER-BOARD MAGNETIC ATTACHMENT SCENE ARTICLES

| | | |
|---|---|---|
| PEOPLE | BONES | BLOOD |
| SEVERED FINGER | RAKE | PHONE |
| MEAT CLEAVER | CONTRABAND | GLASSES |
| KEYBOARD/COMPUTER | SYRINGES | KEYBOARD/COMPUTER |
| GUN | SAFE | DISHES |
| KNIFE | FOOD WITH BITE MARK | FAN |
| RECORD | TOY | TOOLS |
| BOOK | HAIR STRANDS | CLOCK |
| TABLE | RANSOM NOTE | CARDS |
| JEWELS | MIRROR | PENCIL |
| TWINE | COMB | LIGHT BULB |
| HAMMER | NEWSPAPER WITH BLOOD | MEASURING DISTANCE RULER |
| BOX | MARTIAL ARTS STAR | FRUIT |
| BAG | EVIDENCE MARKERS | BROKEN GLASS |
| GREEN PLANT MATERIAL | POLICE LINE | STREET VEHICLES |
| PASSPORT | GUARD RAIL | FLYING VEHICLES |
| FLASHLIGHT | SKID MARKS | ELECTRIC POLE |
| MONEY | RUTS | DEER |
| DICE | CONSTRUCTION SIGN | STREET SIGNS |
| SHOE PRINT | CONE | |
| CASING | LIGHT POLE | |

FIG.1

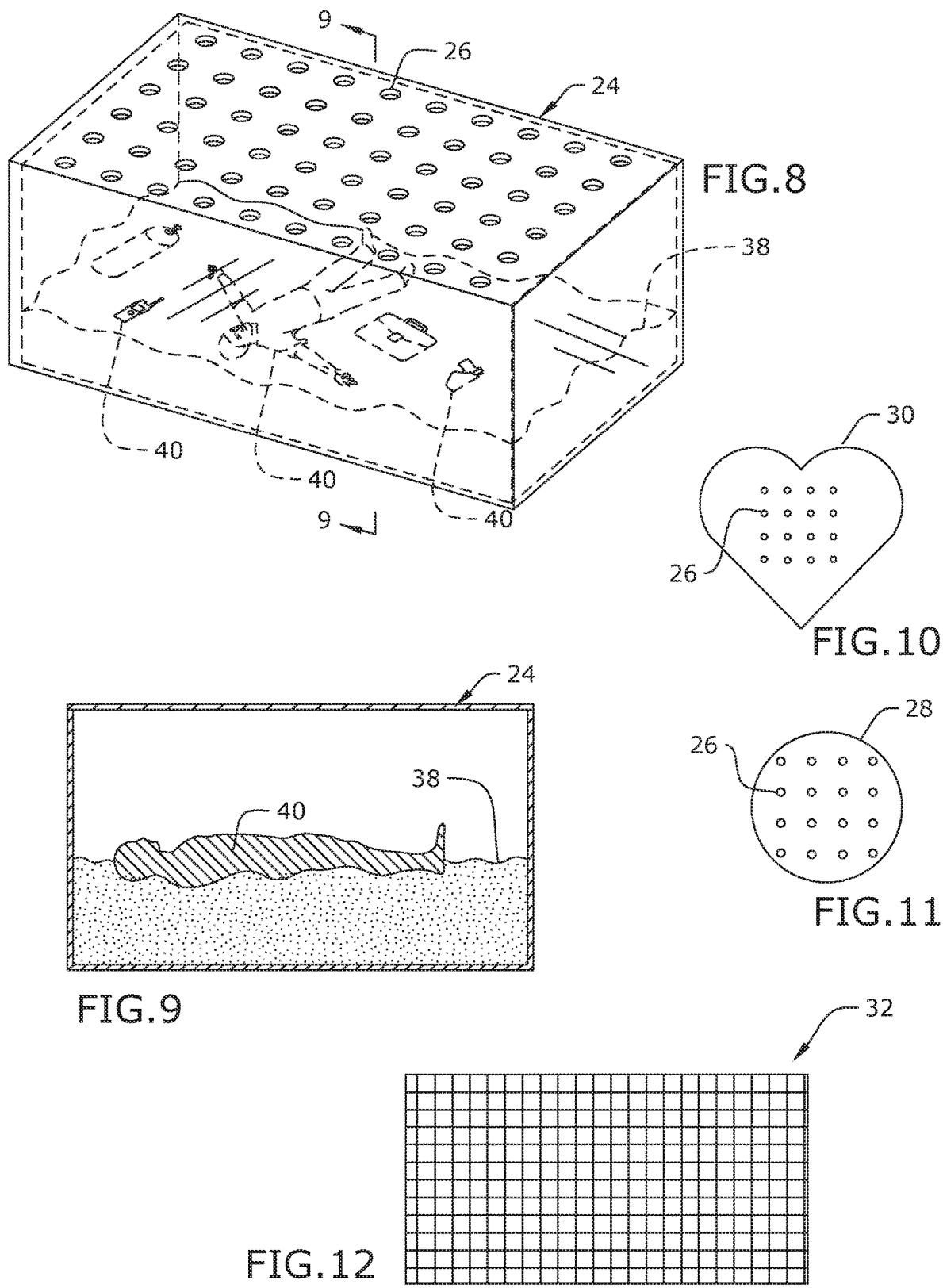

TRAINING KIT FOR INVESTIGATING POLICE SCENES

BACKGROUND OF THE INVENTION

The present invention relates to criminal justice training and, more particularly, to a training kit for investigating police scenes.

Criminal Justice is the system of practices and institutions of governments directed at upholding social control, deterring and mitigating crime, or sanctioning those who violate laws with criminal penalties and rehabilitation efforts. Criminal justice degree programs at four-year institutions typically include coursework in statistics, methods of research, criminal justice, policing, U.S court systems, criminal courts, corrections, community corrections, criminal procedure, criminal law, victimology, juvenile justice, and a variety of special topics. A number of colleges and universities offer a Bachelor of Criminal Justice. Currently, colleges and universities are unable to properly teach criminal justice students how to investigate a police scene due to limited budgeting.

As can be seen, there is a need for an improved training aid for investigating police scenes.

SUMMARY OF THE INVENTION

In one aspect of the present invention, a police scene simulation kit comprises: a container comprising a planar inner surface comprising a printed design, wherein the printed design resembles a police scene; and a plurality of pieces releasably attachable to the planar inner surface, wherein the plurality of pieces each resemble an object at the police scene.

These and other features, aspects and advantages of the present invention will become better understood with reference to the following drawings, description and claims.

BRIEF DESCRIPTION OF THE DRAWINGS

FIG. 1 is a schematic view of an embodiment of the present invention including the kit and the contents;

FIG. 4 is a detail perspective view of an exemplary embodiment of the present invention;

FIG. 8 is a perspective view of the present invention including a cubic transparent container with grid marks;

FIG. 9 is a section view of an embodiment of the present invention along line 9-9 in FIG. 8;

FIG. 10 is a perspective view of an embodiment of the present invention with a heart shaped transparent container with grid marks;

FIG. 11 is a perspective view of an embodiment of the present invention with a round shaped transparent container with grid marks; and FIG. 12 is a schematic view of a grid.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a self-contained police scene diorama. In certain embodiments, a colored crime scene and a colored crash scene are painted onto a planar surface, which may be a magnetic board. Various crime scene or crash scene items are placed onto the magnetic board.

This compact and low cost diorama can be used to create and investigate crime and crash scenes. In addition, students can demonstrate how they will perform police duties (crime scene search pattern, felony stop, destroy deer, etc.). Using the present invention, students can photograph and sketch the crime scenes as well as determine distances and angles.

The crime and crash scenes created from the present invention are viewed from the top. The items can be placed onto the magnetic board to create unique scenes that police officers see in the field. In addition, the board can be used to determine angles, and distances. Further, students may demonstrate how they will conduct a crime scene search pattern by positioning evidence markers. Students can also place items onto the board to demonstrate proper steps for a felony stop.

Figure 2:
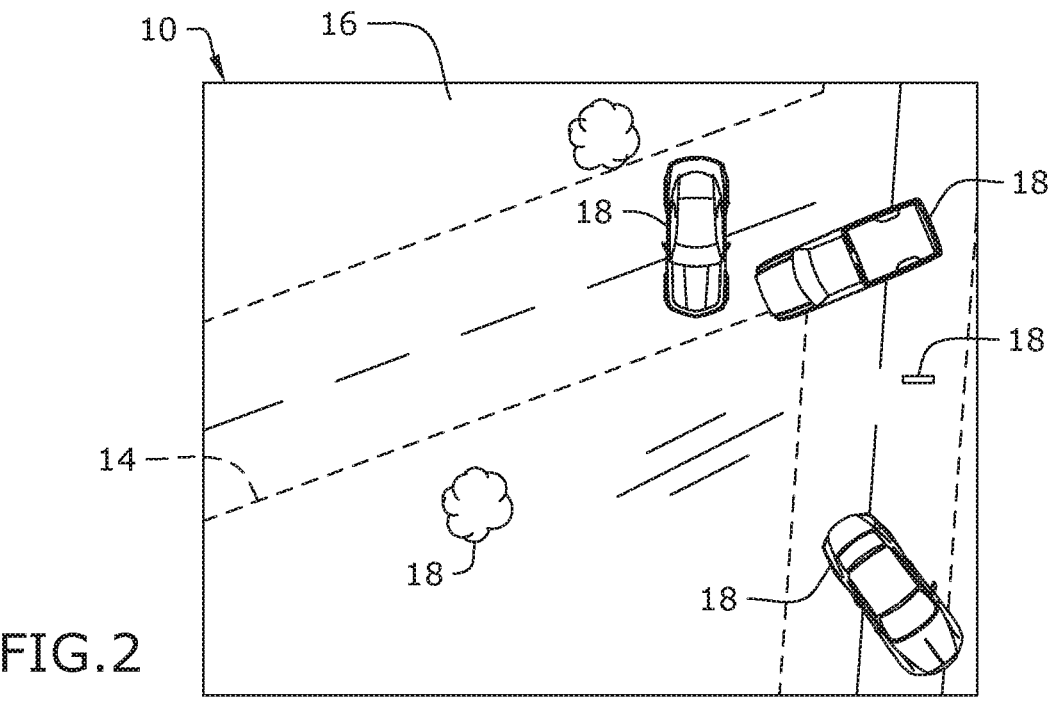
FIG. 2 is a schematic view of an exemplary configuration and design of a crash scene poster board embodiment.
Figure 3:
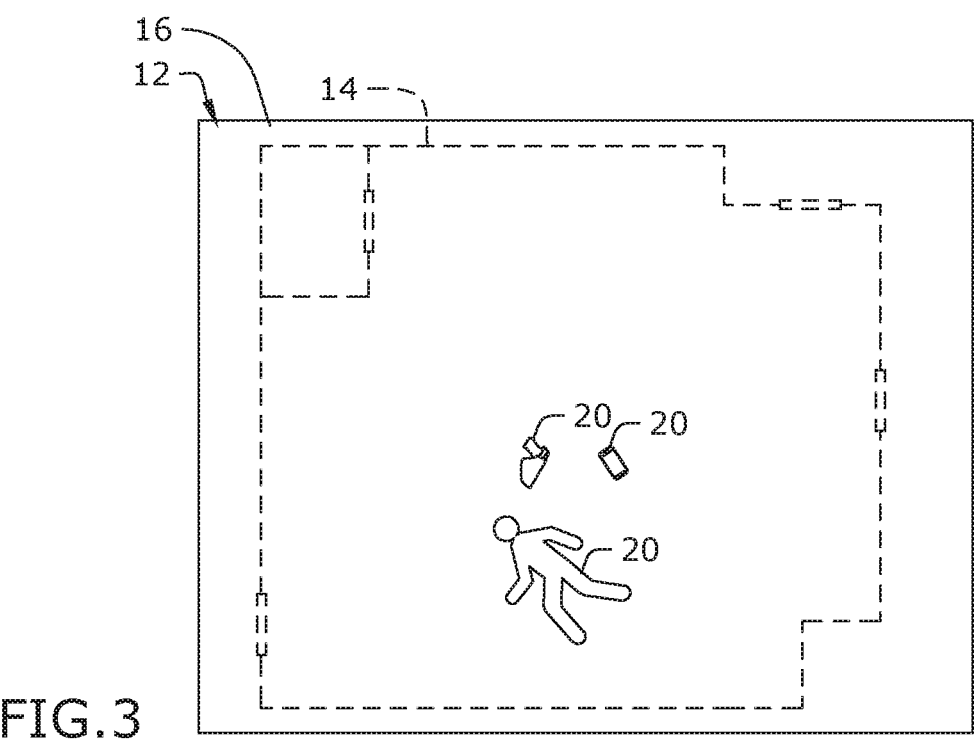
FIG. 3 is a schematic view of an exemplary configuration and design of a crime scene poster board embodiment.
Figure 6:
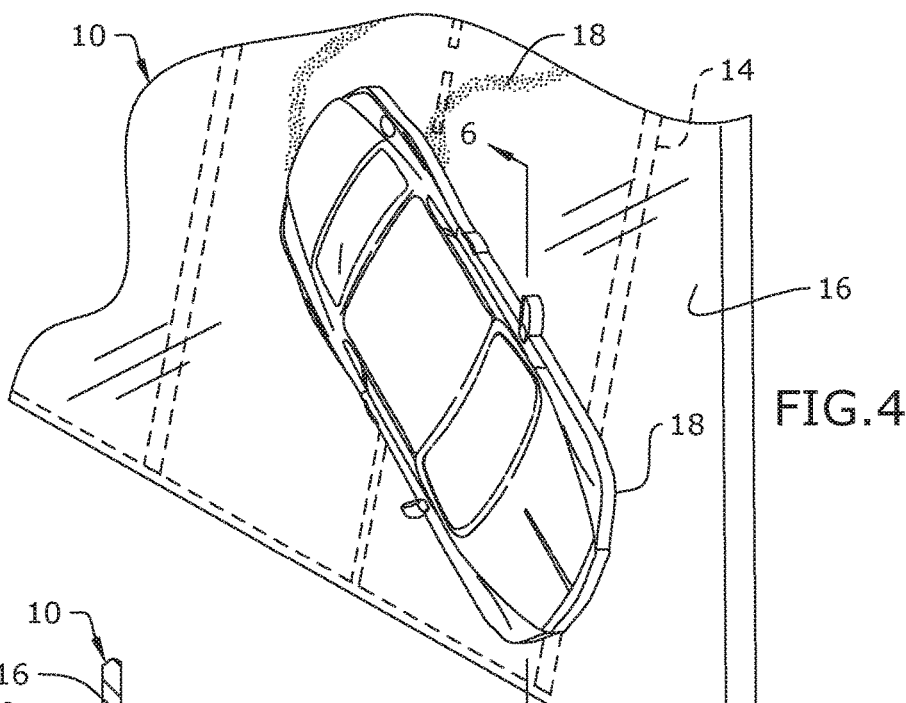
FIG. 6 is a section detail view of an embodiment of the present invention along line 6-6 in FIG. 4.
Figure 5:
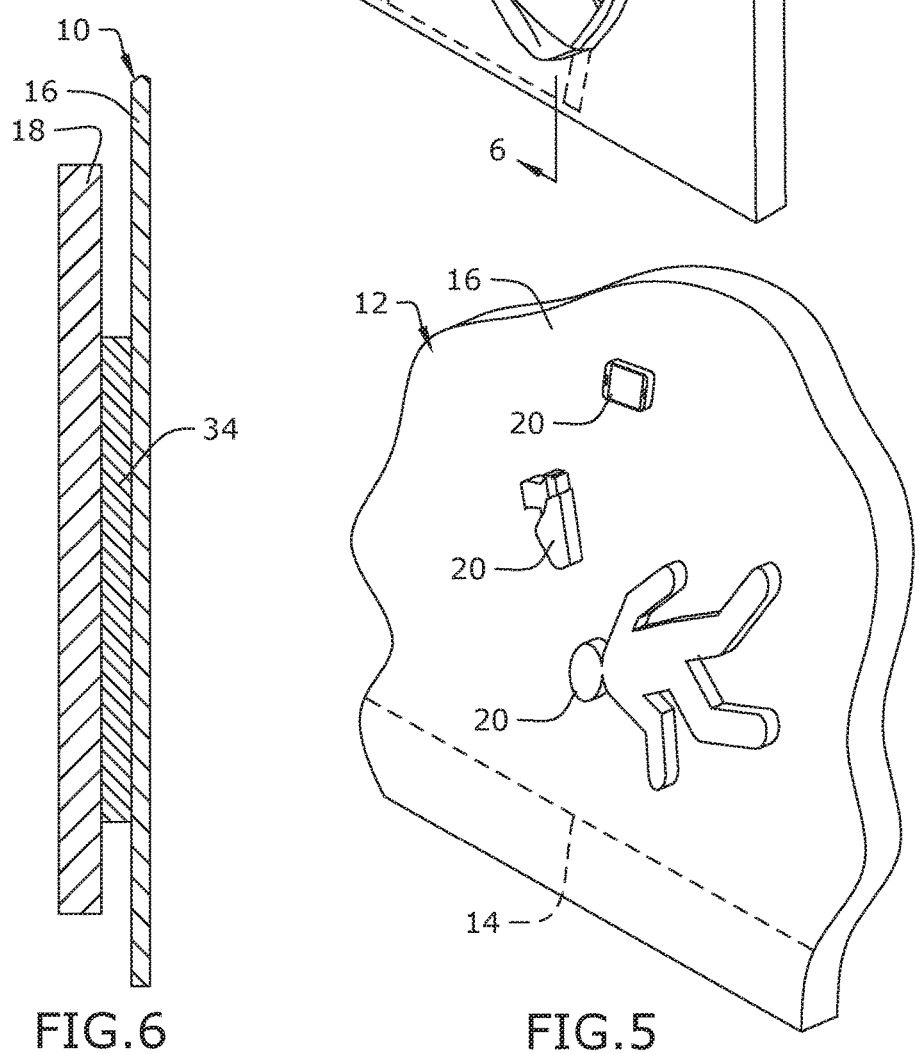
FIG. 5 is a detail perspective view of an exemplary embodiment of the present invention.
Figure 7:
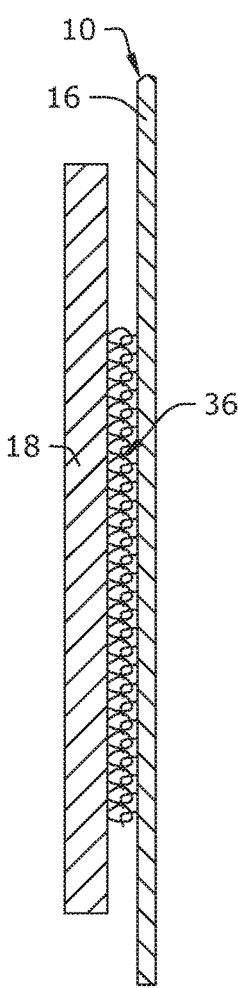
FIG. 7 is a section detail view of an embodiment of the present invention.

Referring to FIGS. 1 through 12, the present invention includes a police scene simulation kit. The kit includes a container. The container includes a planar inner surface 16 and a plurality of sidewalls extending from the planar inner surface 16. The planar inner surface 16 includes a printed design 14. The printed design 14 resembles a police scene 10, 12. The kit further includes a plurality of pieces 18, 20. The plurality of pieces 18, 20 releasably attach to the planar inner surface 16. The plurality of pieces 18, 20 each resemble an object at a police scene.

In certain embodiments, the police scene 10, 12 includes a traffic scene 10. The traffic scene 10 may include a printed design of at least one road, such as two roads intersecting. In such embodiments, the plurality of pieces 18, 20 may resemble a plurality of traffic related pieces 18. For example, the plurality of traffic related pieces 18 may resemble at least one of a vehicle, a person, a light pole, a cone, a construction sign, a guard rail, blood, broken glass, a police line, an electric pole, an animal, a street sign and the like.

In certain embodiments, the police scene 10, 12 includes a crime scene 12. The crime scene may include a printed design of a room layout or an outdoor crime scene. In such embodiments, the plurality of pieces 18, 20 may resemble a plurality of crime related pieces 20. For example, the plurality of crime related pieces 20 may resemble at least one of a dead person, a severed limb, a blade, a computer, a gun, a book, a table, jewels, a hammer, a box, a bag, a passport, a flashlight, money, a shoe print, evidence markers, a bullet casing, bones, a rake, a syringe, a safe, a toy, hair strands, a ransom note, a mirror, a comb, a newspaper, a martial arts star, a police line, blood, a phone, glasses, dishes, a fan, a tool, a clock, cards, a pencil, a light bulb, food and the like.

In certain embodiments, a substantial portion of the planar inner surface 16 includes a magnetic material. For example, the planar inner surface 16 may made of a magnet or a ferromagnetic metal. In such embodiments, each of the plurality of pieces 18, 20 may include a magnet 34 attached to an under side. Therefore, a user may place the pieces 18, 20 on different areas of the planar inner surface 16, and the pieces 18, 20 may retain in their placed area without easily moving around.

In certain embodiments, a portion of the planar inner surface 16 includes a hook and loop fastener 36. In such embodiments, each of the plurality of pieces 18, 20 may include a hook and loop fastener 36 attached to an under side. The hook and loop fastener attached to the pieces 18, 20 releasably secures to the hook and loop fastener 36 attached to the planar inner surface 16. Therefore, a user may place the pieces 18, 20 on different areas of the planar inner surface 16, and the pieces 18, 20 may retain in their placed area without easily moving around.

The present invention may further incorporate a measuring device. For example, the planar inner surface 16 may include a printed grid 32 so that students may take measurements of the fabricated police scene. Alternatively, the present invention may include a measuring ruler. The measuring ruler may be releasably attachable to the planar inner surface 16. For example, the measuring ruler may include a magnet 34 or a hook and loop fastener 36. In such embodiments, the students may place the measuring ruler on the planar inner surface 16 to take measurements of the fabricated police scene.

As illustrated in FIGS. 8 through 11, the container of the present invention may be formed of a transparent container 24 having a base, a plurality of sidewalls extending from the base, and a ceiling. The transparent container 24 may be heart shaped 30, circular shaped 28, rectangular shaped and the like. The inside of the transparent container 24 may include a filler material 38, such as sand. Police scene pieces 40 may be placed on the plush filler material 38. The police scene pieces 40 may include three dimensional representations of a human body, a gun, a cell phone, a suit case and the like. Further, the ceiling of the present invention may include a grid for the students to take measurements. For example, the grid may include evenly spaced apertures 26 formed therethrough so that the student may quickly take measurements of the crime scene within the transparent container 24.

It should be understood, of course, that the foregoing relates to exemplary embodiments of the invention and that modifications may be made without departing from the spirit and scope of the invention as set forth in the following claims.

What is claimed is:

1. A crime scene simulation kit for conducting a crime scene search pattern analysis, comprising:
  a container comprising:
    a base;
    a plurality of sidewalls extending from a periphery of the base; and
    a rigid ceiling attached to at least one of the plurality of sidewalls so that the ceiling is spaced apart from the base;
  a filler material provided on the base;
  a plurality of evidence markers for positioning on the filler material;
  a crime scene comprising an arrangement of a plurality of pieces, said plurality of pieces selected from the group consisting of at least one piece resembling a victim of the crime scene and at least another piece resembling an object of evidentiary interest to the crime scene;
  the rigid ceiling providing a plurality of evenly spaced apart apertures defining a grid,
  whereby a user can take measurements of distances and angles of the crime scene search pattern without removing the ceiling.

2. The crime scene simulation kit for conducting a crime scene search pattern analysis of claim 1, wherein the crime scene is a traffic scene comprising at least one road.

3. The crime scene simulation kit for conducting a crime scene search pattern analysis of claim 2, wherein the at least another piece resembling an object of evidentiary interest resembles at least one of a vehicle, a person, a light pole, a cone, a construction sign, a guard rail, blood, broken glass, a police line, electric pole, an animal and a street sign.

4. The crime scene simulation kit for conducting a crime scene search pattern analysis of claim 1, wherein the crime scene is a room layout.

5. The crime scene simulation kit for conducting a crime scene search pattern analysis of claim 1, wherein the at least another piece resembling an object of evidentiary interest resembles at least one of a person, a severed limb, a blade, a computer, a gun, a book, a table, jewels, a hammer, a box, a bag, a passport, a flashlight, money, a shoe print, an evidence marker, a bullet casing, bones, a rake, a syringe, a safe, a toy, hair strands, a ransom note, a mirror, a comb, a newspaper, a martial arts star, a police line, blood, a phone, glasses, dishes, a fan, a tool, a clock, cards, a pencil, a light bulb, and food.

6. The crime scene simulation kit for conducting a crime scene search pattern analysis of claim 1, further comprising a measuring ruler.

7. The crime scene simulation kit for conducting a crime scene search pattern analysis of claim 6, wherein the measuring ruler is releasably attachable to the base.

8. The crime scene simulation kit for conducting a crime scene search pattern analysis of claim 1, wherein the filler material is sand.

* * * * *